United States Patent [19]
Boxum

[11] Patent Number: 6,148,629
[45] Date of Patent: *Nov. 21, 2000

[54] REFRIGERATOR ENCLOSURE INSTALLATION

[75] Inventor: Bruce Boxum, Angola, Ind.

[73] Assignee: White Consolidated Industries, Inc., Cleveland, Ohio

[*] Notice: This patent is subject to a terminal disclaimer.

[21] Appl. No.: 09/321,446

[22] Filed: May 27, 1999

[51] Int. Cl.$^7$ ....................................................... B60H 1/32
[52] U.S. Cl. ................... 62/239; 62/485; 62/476; 62/428
[58] Field of Search ............................ 62/485, 476, 428, 62/239

[56] References Cited

U.S. PATENT DOCUMENTS

| | | | |
|---|---|---|---|
| 5,355,693 | 10/1994 | McConnell et al. | 62/2.44 |
| 5,383,341 | 1/1995 | Zur et al. | 62/476 |
| 5,473,912 | 12/1995 | Stork | 62/485 |
| 5,782,105 | 7/1998 | Stork | 62/331 |
| 5,946,929 | 9/1999 | Selina et al. | 62/263 |
| 5,966,965 | 1/2000 | Boxum | 62/485 |
| 6,009,721 | 1/2000 | Fukuda et al. | 62/476 |

*Primary Examiner*—William Doerrler
*Assistant Examiner*—Mark Shulman
*Attorney, Agent, or Firm*—Pearne & Gordon LLP

[57] ABSTRACT

A recreational vehicle includes an exterior wall, a floor, a roof, and a refrigerator having a front door, side walls, a rear wall, an absorber located at the rear wall, and a condenser located at the rear wall. The rear wall of the refrigerator is substantially perpendicular to the exterior wall. The recreational vehicle further includes an air passage in which the absorber and the condenser are located. An enclosure extends between one of the side walls and the exterior wall to partially form a side portion of the air passage located between the exterior wall and one of the side walls of the refrigerator. A side intake vent extends through the exterior wall below the enclosure and communicates the side portion of the air passage with air surrounding the recreational vehicle. At least one half of the side intake vent is located forward of the rear wall toward the front door of the refrigerator. An exhaust vent extends through the roof and communicates the air passage with ambient air surrounding the recreational vehicle. When desired, a bottom intake vent extends through the floor and further communicates the air passage with ambient air surrounding the recreational vehicle.

20 Claims, 2 Drawing Sheets

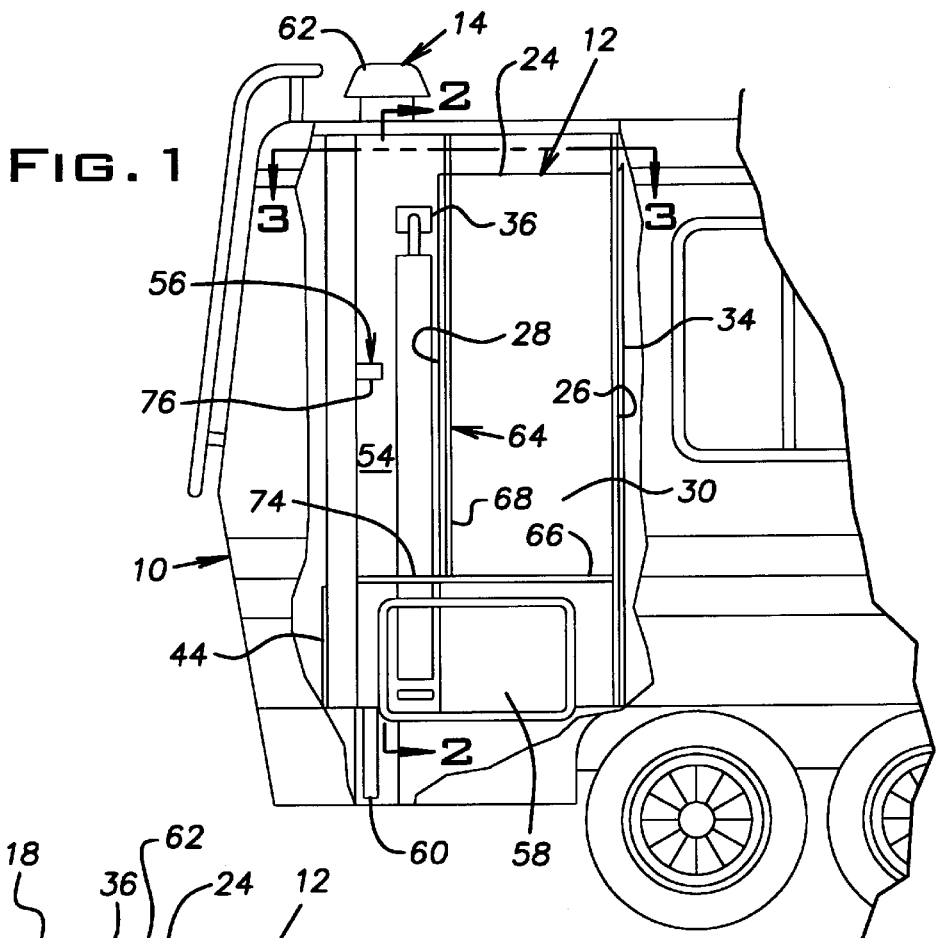
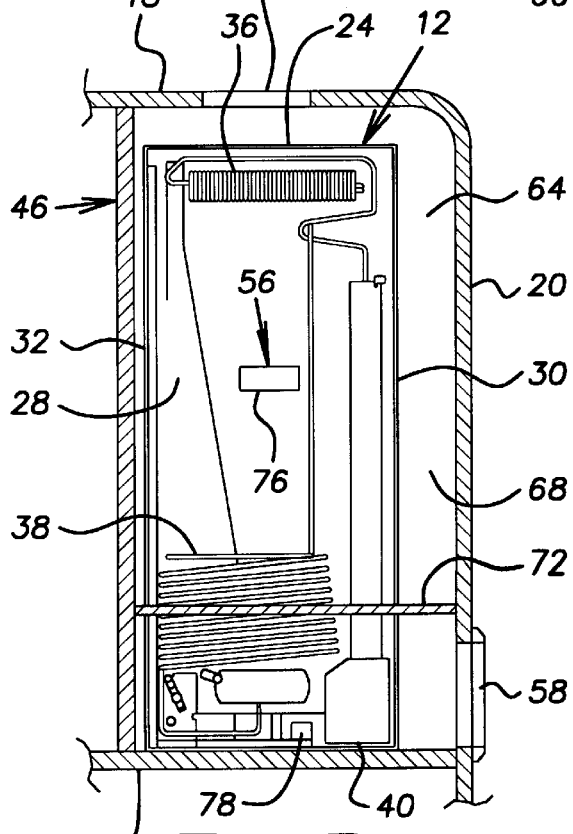
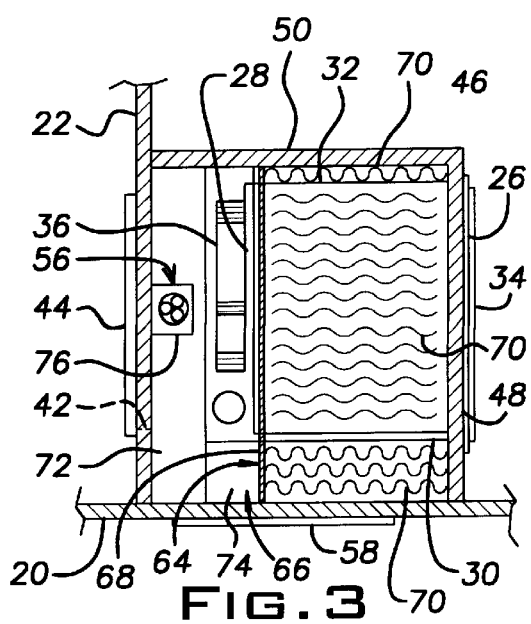

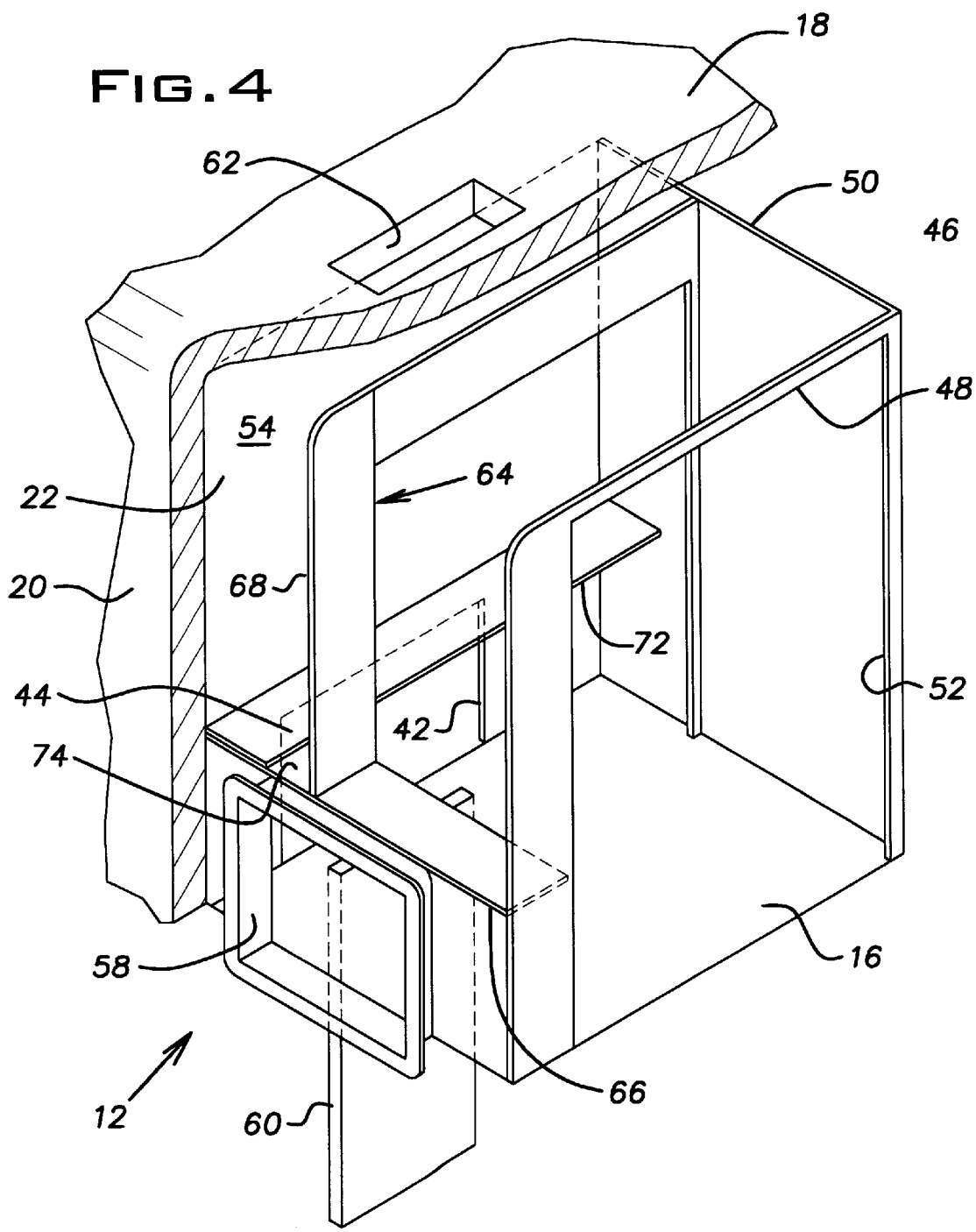

REFRIGERATOR ENCLOSURE INSTALLATION

BACKGROUND OF THE INVENTION

This invention relates generally to ventilation systems and, more specifically, to an improved ventilation system for an absorption refrigerator located within a recreational vehicle.

It is common for recreational vehicles to have refrigerators on board for cooling and preserving food and drinks in a cooled compartment. These refrigerators are usually absorption-type refrigerators which use a heat source to effect refrigeration. An absorption refrigerator typically has a heat generator which heats a solution of a refrigerant and an absorbent. The heat releases the refrigerant from the absorbent to form a high pressure refrigerant vapor. The refrigerant vapor is condensed in a cooling condenser. Low pressure solution from the heat generator is sprayed on the refrigerant vapor in an absorber to absorb the vapor. The absorption causes the pressure of the vapor to be reduced, thereby causing evaporation in an evaporator between the condenser and the absorber. The refrigerant vapor expands in the evaporator which causes a temperature drop in the refrigerant which is used to cool the compartment. The solution of refrigerant and absorbent is then pumped back to the heat generator where it is again heated.

Absorption refrigerators are favored in vehicles, such as campers or recreational vehicles, because a compressor is not required and the heat generator can be an electrical resistance heater or a gas heater. The electrical resistance heater can be powered by a direct current supply of the vehicle or a commercial alternating current supply such as those available at campgrounds. The gas heater can be fueled by propane gas which is usually carried on recreational vehicles.

It is typically necessary to cool the condenser and absorber of the refrigerator. This is economically achieved by creating a "natural draft" airflow over the condenser and absorber. To create this airflow, a generally vertical duct is provided to permit airflow over the condenser and absorber. In some installations, a fan is provided to create a "forced draft" airflow either continuously or only when conditions are unsuitable for natural draft airflow.

Typically the rear wall of the refrigerator is substantially parallel with and faces an outer wall of the recreational vehicle so that the duct is located between the rear wall of the refrigerator and the outer wall of the recreational vehicle. Locating a refrigerator against an outer wall, however, limits the arrangement of objects within the recreational vehicle, such as cabinets, partitions, furniture, and other appliances.

In response to this limitation, the refrigerator and air passage have been located inwardly from all exterior walls by extending the inlet duct through the floor and the outlet duct through the roof. See, for example, U.S. Pat. No. 5,355,693, the disclosure of which is expressly incorporated herein in its entirety by reference. As a result, the refrigerator can be oriented in any manner relative to the outside walls when adequately spaced from the outside walls. When the rear wall of the refrigerator is perpendicular to and near an outside wall, however, chassis structure of the vehicle may not permit an adequate inlet vent through the floor. Accordingly, there is a need in the art for an improved ventilation system which permits an absorption-type refrigerator to be placed with its rear wall perpendicular to and near an outside wall of the recreational vehicle.

BRIEF SUMMARY OF THE INVENTION

The present invention provides a recreational vehicle which overcomes at least some of the above-noted problems of the related art. According to the invention, the recreational vehicle includes an exterior wall, a refrigerator having a front door, side walls, a rear wall, and a condenser located at the rear wall, and an air passage in which the condenser is located. The rear wall of the refrigerator is substantially perpendicular to the exterior wall. A side intake vent extends through the exterior wall and communicates the air passage with air surrounding the recreational vehicle. An exhaust vent also communicates the air passage with ambient air surrounding the recreational vehicle. In a preferred embodiment, a bottom intake vent extends through a floor and further communicates the air passage with air surrounding the recreational vehicle.

BRIEF DESCRIPTION OF THE SEVERAL VIEWS OF THE DRAWING

These and further features of the present invention will be apparent with reference to the following description and drawings, wherein:

FIG. 1 is a fragmented side elevational view of a recreational vehicle, with a portion of a side wall removed for clarity, having an absorption refrigerator and a ventilation system according to the present invention;

FIG. 2 is cross sectional view taken along line 2—2 of FIG. 1 showing the rear of the absorption refrigeration;

FIG. 3 is a cross sectional view taken along line 3—3 of FIG. 1; and

FIG. 4 is a perspective view of the ventilation system of FIG. 1 with the absorption refrigerator and other components removed for clarity.

DETAILED DESCRIPTION OF PREFERRED EMBODIMENTS

FIGS. 1 to 3 illustrate a recreational vehicle 10 having a refrigerator 12 therein and an improved ventilation system 14 for the refrigerator 12 according to the present invention. As used herein, the term recreational vehicle 10 is intended to include mobile homes which are generally permanently installed at a site but are transported along a roadway, as well as typical travel trailers, campers, motor homes, and other vehicles of all types. The recreational vehicle 10 includes a floor 16, a roof 18, and an exterior wall 20 which cooperate to form an interior living space within the recreational vehicle 10. The recreational vehicle 10 also has an interior wall 22 which is perpendicular to the exterior side wall 20.

The refrigerator 12 has a cooled interior compartment for storing food stuffs and other items to be chilled. The refrigerator 12 has a cabinet with a top wall 24, a front wall 26, a rear wall 28, and side walls 30, 32 substantially perpendicular to the top, front and rear walls 24, 26, 28. The front wall 26 has an opening closable with a front door 34 for selectively accessing the cooled interior compartment located within the refrigerator 12.

The refrigerator 12 is located inside the interior space of the recreational vehicle 10 and is oriented with the rear wall 28 parallel to, spaced-apart from and facing the interior wall 22 and one side wall 30 parallel to, spaced-apart from and facing the exterior wall 20. Oriented in this manner, the side walls 30, 32 of the refrigerator 12 are substantially parallel with the exterior wall 20 and substantially perpendicular to the interior wall 22 and the front and rear walls 26, 28 of the refrigerator 12 are substantially parallel with the interior wall 22 and substantially perpendicular to the exterior wall 20. It is noted that the refrigerator 12 can be located either on the floor 16 (as illustrated) or supported above the floor 16 such as upon a cabinet.

As best shown in FIGS. 2 and 3, the illustrated refrigerator 12 is of the absorption cycle type and includes a condenser 36, an absorber 38, and a heat generator or heater 40. The heater 40 can be powered by fuels, such as LP carried onboard the recreational vehicle 10, or by electricity, such as a direct current (DC) power supply of the recreational vehicle 10 or an alternating current (AC) power supply located at a campground. The condenser 36, the absorber 38, and the heater 40 are located at the rear wall 28 and outside the cabinet of the refrigerator 12. Thus the condenser 36, the absorber 38, and the heater 40 are located between the refrigerator rear wall 28 and the interior wall 22 of the recreational vehicle 10. The interior wall 22 of the recreational vehicle 10 preferably adapted to permit access to the heater 40 and the other components of the refrigerator 12. The interior wall 22 of the illustrated embodiment is provided with an access opening 42. An access door 44 seals the opening 42 with an air-tight fit to prevent intake and/or exhaust of air through the opening 42 during operation of the ventilation system 14.

A cabinet 46 cooperates with the floor 16, the roof 18, the interior wall 22, and the exterior wall 20 to enclose the refrigerator 12. The cabinet 46 illustrated cabinet includes a front wall 48 and a side wall 50 substantially perpendicular to the front wall 48. It is noted that the cabinet structure can include other walls within the scope of the present invention such as, for example the interior wall 22 can be an integral rear wall of the cabinet 46. The front wall 48 and the side wall 50 each extend from the floor 16 to the roof 18. The cabinet front wall 48 is substantially perpendicular to the exterior wall 20 and extends from the exterior wall 20 to the cabinet side wall 50. The cabinet side wall 50 is substantially perpendicular to the interior wall 22 and extends from the interior wall 22 to the cabinet front wall 48. The cabinet front wall 50 is provided with an opening 52 (FIG. 4) to provide access to the refrigerator front door 34.

The ventilation system 14 includes a duct or air passage 54 for passing cooling air over the components of the refrigerator 12 and an air assist system 56 for selectively forcing cooling air through the air passage 54. The air passage 54 extends generally vertical and is generally formed by the space between the rear wall 28 of the refrigerator 12 and the interior wall 22 and between the exterior wall 20 and the cabinet side wall 50.

The air passage 54 is provided with a first lower or side intake vent 58, a second lower or bottom intake vent 60, and an upper or exhaust vent 62 which each communicate the air passage 54 with ambient air surrounding the recreational vehicle 10. The side intake vent 58 extends through the exterior wall 20 near the bottom of the air passage 54 and near the floor 16, that is, at the bottom or below the refrigerator 12. Preferably, the side intake vent 58 is vertically located at or below the absorber 38. A substantial portion of the side intake vent 58 is located forward of the refrigerator rear wall 28 toward the front wall 26, that is, adjacent or opposite the refrigerator side wall 30. Preferably, at least one half of the side intake vent 58 is located forward of the refrigerator rear wall 28.

The bottom intake vent 60 extends through the floor 16, that is, at the bottom or below the refrigerator 12. It is noted that in some instances the side intake vent 58 may provide adequate airflow so that supplemental air from the bottom intake vent 60 is not needed.

The exhaust vent 62 extends through the roof 18 at the top of the air passage 54, that is, at the top or above the refrigerator 12. Preferably, the exhaust vent 62 is located at or above the condenser 36. The exhaust vent 62 can alternatively have other suitable configurations within the scope of the present invention, for example the exhaust vent 62 can alternatively extend through the exterior wall 20. The shown vents 58, 60, 62 are generally rectangularly-shaped but any other suitable shapes may be utilized.

Each of the vents 58, 60, 62 are preferably provided with caps and/or covers which have suitable openings therein for passage of air therethrough. The covers can be formed from any suitable material such as, for example, plastic or sheet metal. Note that the cover of the exhaust vent 62, and the exhaust vent itself, must withstand some degree of heating. The covers of the intake vents 58, 60 should prevent the entry of varmints and debris into the air passage 54.

An enclosure 64 is preferably provided around the rear of the refrigerator 12 to prevent hot stagnant air from accumulating around the refrigerator 12 which would decrease performance of the refrigerator 12. The illustrated enclosure 64 includes a horizontal portion 66 which extends between the exterior wall 20 and the side wall 30 of the refrigerator 12. The horizontal portion 66 also extends from the cabinet front wall 48 to at least the rear wall 28 of the refrigerator 12 and preferably to the interior wall 22. The horizontal portion 66 is located above the side intake vent 58 and is preferably located at the top of the side intake vent 58. The illustrated enclosure 64 also includes a vertical portion 68 which extends between the exterior wall 20 and the refrigerator side wall 30 from the horizontal portion 66 to the roof 18, between the exterior sidewall 20 and the cabinet side wall 50 from the refrigerator top wall 24 to the roof 18, and between the other refrigerator side wall 32 and the cabinet side wall 50 from the floor 16 to the roof 18. The vertical portion 68 is located at or near the rear wall 28 of the refrigerator 12. Spaces formed around the refrigerator 12 can be filled with thermal insulation 70.

With the air passage 54 formed in this manner, the air passage 54 has a main portion and a side portion. The main portion is formed between the external wall 20 and the cabinet side wall 50, between the refrigerator rear wall 28 along with the vertical portion 68 of the enclosure 64 and the internal wall 22, and between the floor 16 and the roof 18. The side portion is formed between the external wall 20 and the refrigerator side wall 30, between the cabinet front wall 48 and the refrigerator rear wall 28, and between the floor 16 and the horizontal portion 66 of the enclosure 64. The main portion is adapted for generally vertical airflow through the air passage 54 while the side portion is adapted for generally lateral airflow from the side intake vent 58 to the main portion of the air passage 54. It can be appreciated that the side portion of the air passage 54 permits an increased amount of airflow through the side intake vent 58 than would be obtained with only the main portion of the air passage 54. While the illustrated air passage 54 is formed by numerous separate walls, it is noted that the air passage 54 can alternatively be formed entirely or partially by integral duct work such as formed by sheet metal or can partially or fully integral with the refrigerator.

Baffles are preferably provided in the air passage 54 to ensure airflow is directed along the rear wall 28 of the refrigerator 12. In the illustrated embodiment a first baffle 72 is provided along the interior wall 22 which extends from the exterior wall 20 to the cabinet side wall 50 but only partially extends from the interior wall 22 toward the refrigerator rear wall 28. The first baffle 72 is vertically located at the height of the enclosure horizontal portion 66. The first baffle 72 prevents airflow directly up along the interior wall 22 and forces upwardly traveling air forwardly toward the refrigerator rear wall 28. The rear part of the enclosure horizontal portion 66 forms a second baffle 74. The second baffle 74 prevents airflow directly up along the exterior wall 20 and forces upwardly traveling air inwardly toward the refrigerator rear wall 28. It is noted that the baffles 72, 74 can take other forms, the baffles 72, 74 can be at other locations, and there can be other quantities of baffles 72, 74.

The air assist system 56 is provided to transform the "natural airflow" system into a "forced airflow" system. The air assist system 56 increases air velocity within the air passage 54 to allow for optimum operation of the refrigeration system of the refrigerator 12. The air assist system 56 is preferably automatic so that it operates only when the ambient air temperature is not sufficient to support natural airflow and adequately cool the refrigerator components 36, 38, 40. Thus, the air assist system 56 preferably operates only when the ambient air temperature is above a predetermined temperature such as about 100° F.

The air assist system 56 includes a fan or blower 76 which is located in the air passage 54 and a thermal switch 78 operatively connected to the blower 76. Preferably, the blower 76 is located generally midway between the intake vents 58, 60 and exhaust vent 62 and midway between the condenser 36 and the absorber 38. The blower 76 is preferably secured to the interior wall 22 and should permit airflow through the air passage 54 when the blower 76 is not operating. The blower 76 may be a commercially available blower of any suitable type. The blower 76 is preferably a 12 V DC blower and connected to the recreational vehicle power distribution system.

The thermal switch 78 preferably connects the blower 76 to the power supply and is a switch which is normally open and closes when the temperature sensed by a temperature sensor rises above a certain level. The temperature sensor is preferably located near the intake vents 58, 60 so that it senses the temperature of air entering through the intake vents 58, 60 which is at ambient outdoor temperature. This location is upstream of the components 36, 38, 40 of the refrigerator 12 located in the air passage 54 and heating the air within the air passage 54. The temperature sensor, however, can be located at alternative locations which give an indication of the temperature of ambient air surrounding the recreational vehicle 12, such as outside the air passage 54, or give an indication that the refrigerator components 36, 38, 40 are not performing efficiently, such as on the coil of the condenser 36. The thermal switch 78 prevents operation of the air assist system 56 at low outdoor ambient temperatures, when it is not needed, so that the blower 76 is energized only when air movement in the air passage 54 requires assistance.

During operation of the refrigerator 12, the condenser and absorber 36, 38 constitute heat dissipating or heat rejecting members of the refrigerator refrigeration system. Heat rejected from these components 36, 38 causes an upward flow of air within the air passage 54 by natural draft. Heated air rises to the exhaust vent 62 where it exits the air passage 54 to outside the recreational vehicle 10. Cooler outside air, which is at ambient temperature, enters the air passage 54 from outside the recreational vehicle 10 through the side and bottom intake vents 58, 60. The cooler air vertically rises through the air passage 54 along the rear wall 28 of the refrigerator 12 and exits the air passage 54 and the recreational vehicle 10 through the exhaust vent 62. The airflow through the air passage 54 cools the condenser and absorber 36, 38 and carries heat outside the recreational vehicle 10 through the exhaust vent 62.

The vertical arrangement of the air passage 54 promotes airflow by creating a chimney effect or natural draft. That is, the air heated by the condenser, absorber, and heater 36, 38, 40 tends to rise through the air passage 54 until it exits the exhaust vent 62 and draws in cooler outside air through the side and bottom intake vents 58, 60. If the temperature sensed by the thermal switch 78 rises to the predetermined temperature, the blower 76 is activated to ensure adequate airflow through the air passage 54. When the temperature sensed by the thermal switch 78 drops below the predetermined temperature, the blower 76 is deactivated and air once again flows through the air passage 54 by natural draft. It is noted that airflow through the air passage 54 can also provide combustion air and/or cooling air to the heater 40 through the intake vents 58, 60 and exhaust combustion products and/or cooling air from the heater 40 through the exhaust vent 62.

It can be seen from the above description, that the components 36, 38, 40 of the refrigerator 12 can be adequately cooled with a simple air passage 54 and vents 58, 60, 62 which permit the refrigerator 12 to be located near an exterior wall 20 with its rear wall 28 perpendicular to the exterior wall 20.

Although particular embodiments of the invention have been described in detail, it will be understood that the invention is not limited correspondingly in scope, but includes all changes and modifications coming within the spirit and terms of the claims appended hereto.

What is claimed is:

1. A recreational vehicle comprising:
    an exterior wall;
    a refrigerator having a front door, side walls, a rear wall, and a condenser located at said rear wall, said rear wall being substantially perpendicular to said exterior wall;
    an air passage in which said condenser is located;
    an intake vent extending through said exterior wall and communicating said air passage with air surrounding the recreational vehicle; and
    an exhaust vent communicating said air passage with ambient air surrounding the recreational vehicle.

2. The recreational vehicle according to claim 1, wherein at least a substantial portion of said intake vent is located forward of said rear wall toward said front door.

3. The recreational vehicle according to claim 3, wherein at least half of said intake vent is located forward of said rear wall toward said front door.

4. The recreational vehicle according to claim 1, wherein said air passage has a side portion extending between said exterior wall and one of said side walls of said refrigerator.

5. The recreational vehicle according to claim 4, further comprising an enclosure extending between one of said side walls and said exterior wall to partially form said side portion of said air passage.

6. The recreational vehicle according to claim 4, wherein said enclosure is located above said intake vent.

7. The recreational vehicle according to claim 6, further comprising thermal insulation located between said refrigerator and said exterior wall above said enclosure.

8. The recreational vehicle according to claim 1, further comprising an interior wall spaced apart from said rear wall of said refrigerator with said air passage therebetween and substantially perpendicular to said exterior wall.

9. The recreational vehicle according to claim 8, further comprising a baffle within said air passage extending from said interior wall and adapted to direct airflow along said rear wall of the refrigerator.

10. The recreational vehicle according to claim 8, further comprising a blower positioned to promote airflow within said air passage over said condenser when energized.

11. The recreational vehicle according to claim 10, wherein said blower is located in said air passage and secured to said interior wall.

12. The recreational vehicle according to claim 1, further comprising a baffle within said air passage adapted to direct airflow along said rear wall of the refrigerator.

13. The recreational vehicle according to claim 1, further comprising a blower positioned to promote airflow within said air passage over said condenser when energized.

14. The recreational vehicle according to claim 13, wherein said refrigerator has an absorber at said rear wall and said blower is located in said air passage between said absorber and said condenser.

15. The recreational vehicle according to claim 1, further comprising a floor and a bottom intake vent extending through said floor and communicating said air passage with air surrounding the recreational vehicle.

16. The recreational vehicle according to claim 1, further comprising a roof and said exhaust vent extending through said roof.

17. A recreational vehicle comprising:

an exterior wall;

a roof;

a refrigerator having a front door, side walls, a rear wall, an absorber located at said rear wall, and a condenser located at said rear wall, said rear wall being substantially perpendicular to said exterior wall;

an air passage in which said absorber and said condenser are located;

an enclosure extending between one of said side walls and said exterior wall to partially form a side portion of said air passage extending between said exterior wall and one of said side walls of said refrigerator;

a side intake vent extending through said exterior wall below said enclosure and communicating said side portion of said air passage with air surrounding the recreational vehicle, at least half of said side intake vent located forward of said rear wall toward said front door; and an exhaust vent extending through said roof and communicating said air passage with ambient air surrounding the recreational vehicle.

18. The recreational vehicle according to claim 17, further comprising a floor and a bottom intake vent extending through said floor and communicating said air passage with air surrounding the recreational vehicle.

19. The recreational vehicle according to claim 17, further comprising a baffle within said air passage adapted to direct airflow along said rear wall of the refrigerator.

20. The recreational vehicle according to claim 17, further comprising a blower positioned in said air passage between said absorber and said condenser to promote airflow within said air passage over said absorber and said condenser when energized.

* * * * *

UNITED STATES PATENT AND TRADEMARK OFFICE
CERTIFICATE OF CORRECTION

PATENT NO.    : 6,148,629
DATED         : November 21, 2000
INVENTOR(S)   : Boxum Page 1 of 1

It is certified that error appears in the above-identified patent and that said Letters Patent is hereby corrected as shown below:

On Title Page, section [56], References Cited, U.S. PATENT DOCUMENTS, insert:

| | | |
|---|---|---|
| --2,592,712 | 4/1952  | Knoy-- |
| --3,245,224 | 4/1966  | Wilkinson-- |
| --3,512,371 | 5/1970  | Gurt et al.-- |
| --3,771,320 | 11/1973 | Kenneryd et al.-- |
| --3,906,740 | 9/1975  | Thomas-- |
| --4,016,730 | 4/1977  | DeVilliers-- |
| --4,286,569 | 9/1981  | Bergman et al.-- |
| --4,914,919 | 4/1990  | Walfridson et al.-- |

Signed and Sealed this

Nineteenth Day of June, 2001

Attest:

*Attesting Officer*

NICHOLAS P. GODICI
*Acting Director of the United States Patent and Trademark Office*